United States Patent [19]

Evans

[11] 4,056,159
[45] Nov. 1, 1977

[54] AIR CUSHION VEHICLE

[76] Inventor: Carmi Goodrich Evans, Hoddview Mobile Estates, Rte. 1, Space 12, Hubbard, Oreg. 97032

[21] Appl. No.: 704,232

[22] Filed: July 12, 1976

[51] Int. Cl.² .............................................. B60V 1/08
[52] U.S. Cl. ................................. 180/120; 180/126
[58] Field of Search ................ 180/120, 126, 7 FS; 115/15

[56] References Cited

U.S. PATENT DOCUMENTS

| | | | |
|---|---|---|---|
| 3,027,860 | 4/1952 | Priest | 180/126 X |
| 3,198,274 | 8/1965 | Cocksedge | 180/120 |
| 3,486,577 | 12/1969 | Jackes | 180/126 X |
| 3,621,932 | 11/1971 | Tattersall | 180/126 |
| 3,869,020 | 3/1975 | Holland | 180/120 |

FOREIGN PATENT DOCUMENTS

| | | | |
|---|---|---|---|
| 4,231 of | 1906 | United Kingdom | 180/120 |

Primary Examiner—Joseph F. Peters, Jr.
Assistant Examiner—Terrance L. Siemens
Attorney, Agent, or Firm—Brown & Martin

[57] ABSTRACT

A vehicle, primarily a marine vessel, but also adaptable for travel over snow or ice, which is supported and propelled by air flow through a channel in the underside of the body. An impeller in a duct in the forward end of the vehicle provides the air flow, which can be deflected rearwardly, downwardly forwardly and varied laterally for full control of the vehicle. The air flow channel is divided into a central channel and high speed side channels by longitudinal curtains, the side channels conducting air to steering vanes and rudders at the rear of the body. Trim rudders also extend across the rear of the channel to control lift and roll at the rear of the vehicle. In one form, the vehicle has an inflatable bow to seal the forward end of the channel at low speed, or to open the channel to ram air at high speed.

4 Claims, 11 Drawing Figures

AIR CUSHION VEHICLE

BACKGROUND OF THE INVENTION

Air cushion vehicles are generally of two basic types, one type having a flexible or partially flexible skirt to contain lifting air, which leaks out under the skirt and can be controlled to some extent for balance and steering. Usually the propulsion and directional control are obtained by separate means, such as propellers and rudders, on top of the vehicle. The other basic type has rigid side walls surrounding an air chamber, the walls being immersed in or in sliding contact with the supporting surface to minimize air leakage. The supporting air can be used for propulsion, since the energy is well contained, but additional propulsion means is often used.

A primary problem with all air cushion vehicles is stabilization and directional control, since there is no appreciable contact with the supporting surface. The air cushion provides a very low friction support and the vehicle is easily displaced by small disturbances. Small air cushion vehicles, in particular, are affected by movement of the occupants and can be steered, although unreliably, by offsetting the load or balance. For effective control it is necessary to have complete control over the pressure distribution and direction of exit of the air flow from the air cushion supporting the vehicle.

SUMMARY OF THE INVENTION

The air cushion vehicle described herein is primarily a marine vessel and has a hull or body, with a longitudinal air channel in the underside bounded by rigid side walls. In the bow or forward portion is a duct, through which air is drawn by a driven impeller and forced into the channel provide a supporting air cushion. The air channel is divided into a central channel and a pair of side channels by longitudinal curtains. Air from the side channels is directed to control vanes which can be controlled to provide steering or reverse thrust action, and to directional control rudders at the rear of the channel, which is open so that the air flow provides propulsive thrust.

Valves in the forward duct control the air flow for rearward, downward or forward thrust and are operable differentially for lateral control and balance. Trim rudders recessed in the rear portion of the air channel also provide lift and balance control. Additional steering vanes in the forward portions of the side walls are used for directional and reverse thrust control, giving the vehicle rapid response and fast turning capability.

In one form the vehicle has an inflatable bow, which is inflated at low speed to seal the forward end of the air channel and maintain the air cushion. At high speed, the inflatable bow is collapsed to open the air channel and admit ram air for added efficiency.

The primary object of this invention, therefore, is to provide a new and improved air cushion vehicle.

Another object of this invention is to provide an air cushion vehicle utilizing air flow through an underside channel for lift and propulsion.

Another object of this invention is to provide an air cushion vehicle having front and rear air flow directing means for directional and thrust control, both forward and reverse.

A futher object of this invention is to provide an air cushion vehicle having differential air flow control means within the air channel for lateral balance and stability.

Other objects and advantages will be apparent in the following detailed description, taken in conjunction with the accompanying drawings, in which.

DESCRIPTION OF THE PREFERRED EMBODIMENTS

Figure 1:
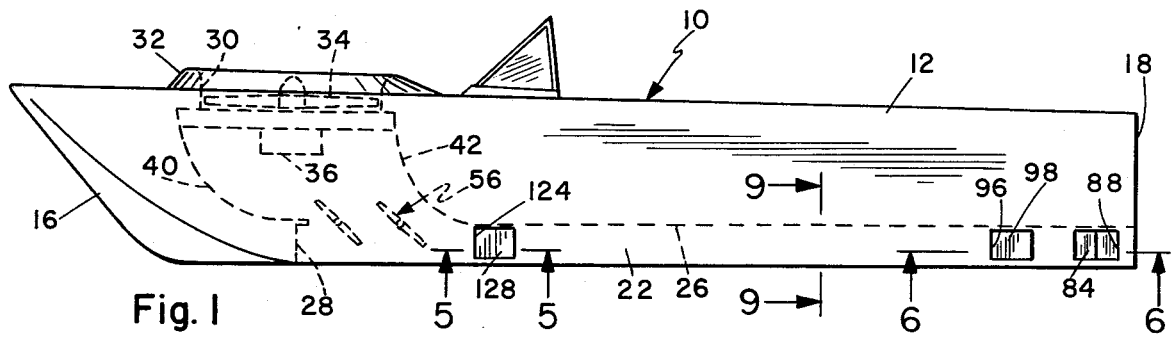
FIG. 1 is a side elevation view of the air cushion vehicle.
Figure 2:
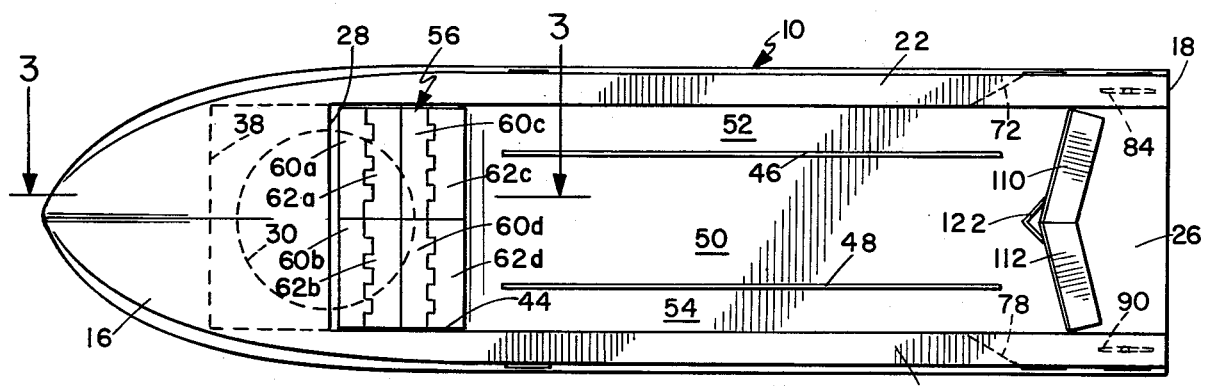
FIG. 2 is an underside view thereof.

The vehicle is primarily for use on water, since the air cushion is intended to be contained between rigid side walls which are immersed in the water. However, the vehicle will operate over snow, or reasonably smooth ice if the air leakage under the walls is minimized. With suitable power available, the vehicle can also be lifted clear of the surface for short periods to clear obstacles.

The vehicle has a body 10 in the form of a boat hull, with sides 12 and 14, a bow 16, a stern 18 and a cockpit area with a floor 20. The size, configuration and structure will depend on the specific use of the vehicle. Sides 12 and 14 have side walls 22 and 24, respectively, which extend below floor 20 to enclose a longitudinal air channel 26 in the underside of the body. The air channel 26 is closed at the forward end by a transverse wall 28 and is open at the stern 18.

In the upper portion of the bow 16 is a duct 30 with an inlet 32. Mounted in the duct is an impeller 34 driven by a suitable motor or engine 36, to draw air into a plenum chamber 38 below the duct. The plenum chamber 38 has a front wall 40 and a rear wall 42, which curve downwardly and rearwardly to join the air channel 26 at an outlet 44, immediately rearwardly of transverse wall 28.

Fixed to the underside of floor 20 in the air channel 26 are two longitudinally extending curtains 46 and 48, which divide the air channel into a central channel 50 and side channels 52 and 54. Since the air flow from the peripheral portion of the impeller will be somewhat faster than from near the hub, the air flow through side channels 52 and 54 will be faster than through center channel 50. The curtains 46 and 48 extend from adjacent outlet 44 to a position near stern 18 and hang substantially vertically from the floor 20. To prevent slapping and hammering of water on the structure at high speed, the curtains are perferably of pliable material, such as rubber or plastic.

Figure 4:
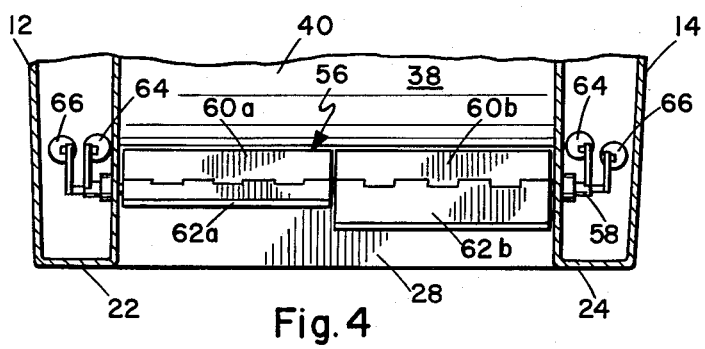
FIG. 4 is a sectional view taken on line 4—4 of FIG. 3.

Mounted in outlet 44 is a valve assembly 56, comprising four similar doubled hinged valve units in side by side pairs, mounted on two parallel hinge rods 58 extending transversely across the outlet. Each valve unit has a front flap 60 and a rear flap 62, the corresponding flaps of the four units being labelled a, b, c and d for reference. In relation to the normal orientation of the vehicle, valve flaps 60 and 62a are at the left front of outlet 44, flaps 60 and 62b are at the right front, flaps 60 and 62c are at the left rear and flaps 60 and 62d are at the left rear. Each front flap 60 is controlled by a suitable actuator 64 and each rear flap 62 is controlled by an actuator 66, as in FIG. 4. The operation and function of the valve assembly is described hereinafter in detail.

Side walls 22 and 24 are double walled and hollow, at least at the rear portion, each having an inner wall 68 and an outer wall 70. Side wall 22 has a tunnel 72 with an inlet 74 in nner wall 68 and an outlet 76 at stern 18. Air from side channel 52 can thus pass through tunnel 72. Side wall 24 has a similar tunnel 78, with an inlet 80 and a rearward outlet 82,to conduct air flow from side channel 54.

In the rear portion of tunnel 72 is a rudder 84, pivotal about a vertical axis and controlled by an actuator 86. On opposite sides of the rudder, the inner and outer walls of the tunnel 72 have openings 88. In tunnel 78 is a similar rudder 90 controlled by an actuator 92, the sides of the tunnel having openings 94 at the rudder position.

In the forward portion of tunnel 72 the outer wall has an outlet opening 96, which can be closed by a diverter vane 98 hinged on a vertical axis at the rear of the opening. Hinged on the same axis is a baffle 100 which normally lies flat against the inside of the outer wall 70. Tunnel 78 has a simlar outlet opening 102 with a diverter vane 104 and a baffle 106 hinged in a similar manner. Diverter vane 104 is controlled by an actuator 108, as in FIG. 8, a similar actuator, not shown, being used to operate diverter vane 98.

Figure 7:
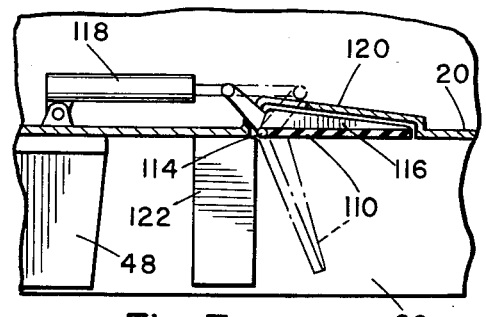
FIG. 7 is a further enlarged sectional view taken on line 7—7 of FIG. 6.
Figure 9:
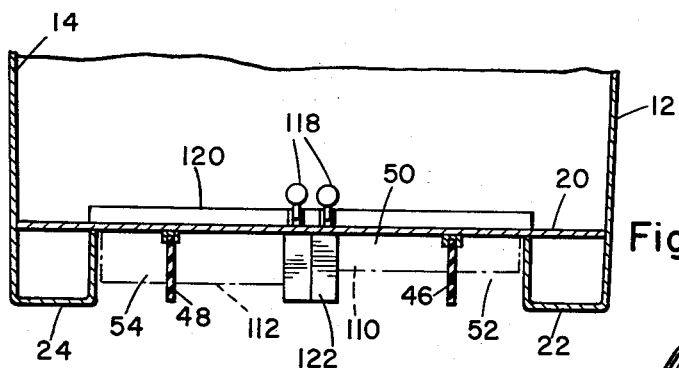
FIG. 9 is an enlarged sectional view taken on line 9—9 of FIG. 1.

Mounted below floor 20 immediately rearwardly of inlets 74 and 80 are two trim rudders 110 and 112, which are hinged at their leading edges on hinges 114 and sweep back on opposite sides of the center line of air channel 26. The trim rudders are substantially flat and preferably made from pliable material, such as rubber or plastic, with reinforcing ribs 116. Each trim rudder is operated by an actuator 118 and, in retracted position, is recessed in a cavity 120 in the floor 20, as in the full line position in FIG. 7. The trim rudders can be lowered individually, as in broken line positions in FIGS. 7 and 9, to provide controlled obstruction of the air channel 26. This diverts air to the side wall tunnels for directional control and also controls lift, as hereinafter described. Due to the sweep back of the trim rudders, there will be a triangular gap between them when lowered. To minimize air leakage a V-shaped shroud 122 is fixed below floor 20 to cover the central junction of the trim rudders as they are lowered.

Figure 5:
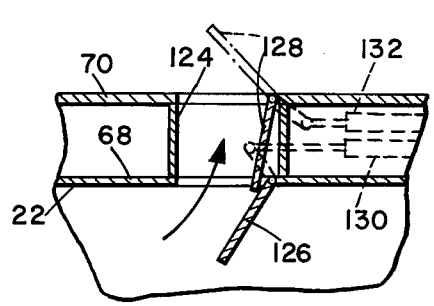
FIG. 5 is an enlarged sectional view taken on line 5—5 of FIG. 1.

To add to the steering capability of the vehicle, steering ports 124 are provided in the side walls 22 and 24 adjacent the forward end of air channel 26. The structure in side wall 22 is illustrated in FIG. 5, side wall 24 having a similar arrangement. A vane 126 is hinged to the rear of port 124 at the inner wall 68, and a vane 128 is hinged to the rear of the port at outer wall 70. The vanes 126 and 128 are operated by actuators 130 and 132, respectively.

Figures 10, 11:
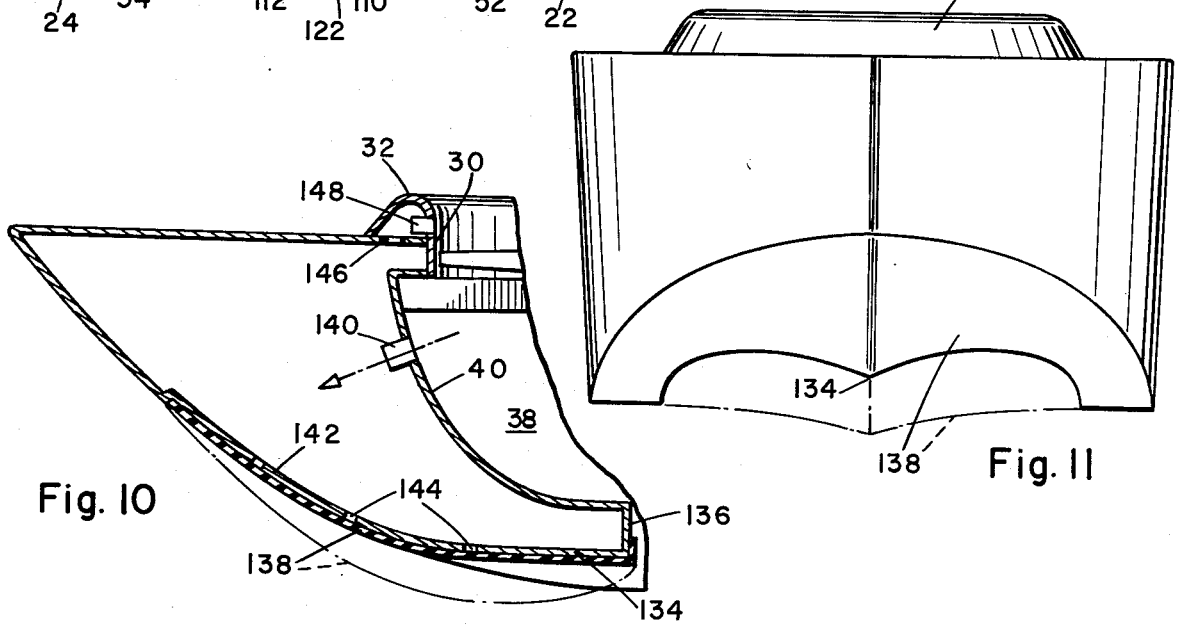
FIG. 10 is a sectional view similar to a portion of FIG. 3, showing an alternative inflatable bow.
FIG. 11 is a front elevation view of the vehicle with the inflatable bow.

An alternative bow design is illustrated in FIGS. 10 and 11. The keel portion 134 is raised above the bottom line of the side walls and the underside has a shallow Vee configuration, so that transverse wall 136 does not completely close the air channel. At high speed, with the vessel riding up on an air cushion, the front of the air channel is open to ram air, which adds to the lift and propulsion efficiency of the air cushion.

For low speed operation, when the air cushion is required to provide lift, the forward end of the air channel is sealed by an inflatable boot 138 attached to the underside of the bow. In the inflated position, indicated in broken line, the boot extends into the water and closes the air channel. Inflation is accomplished by using pressurized air from plenum chamber 38 through an inlet valve 140 in front wall 40. The lower portion 142 of the bow has ports 144 to admit air to the interior of the boot.

Air pressure is released from the boot through an outlet port 146 and outlet valve 148 in the duct inlet 32. The outlet valve 148 may be a pressure relief valve to act as a shock absorber for water loads imposed on the inflated boot.

Figure 3:
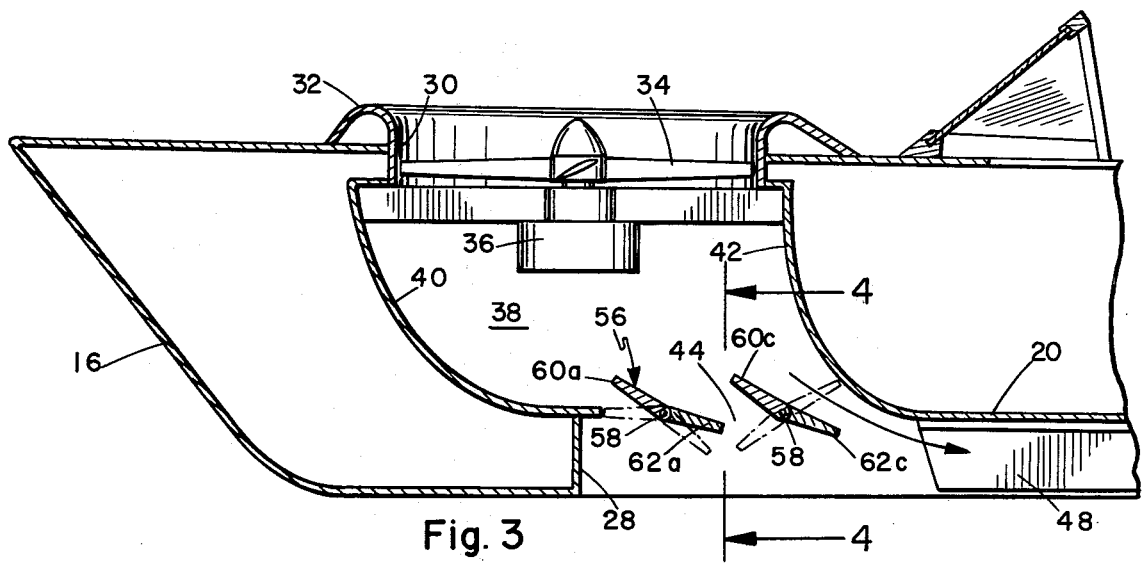
FIG. 3 is an enlarged sectional view taken on line 3—3 of FIG. 2.

In operation, the lift, propulsion, steering and braking by reverse thrust are all dependent on the air flow from impeller 34. The valve assembly 56 controls the proportion of lift to thrust at the forward end by selective movement of the valve elements. In the full line position in FIG. 3, for example, front flaps 60a and 60c are raised, while rear flaps 62a and 62c are depressed. Air flow is thus directed rearwardly into the air channel. By lowering front flap 60a and rear flap 62a to the positions shown in broken line, downward air flow through the forward portion of the valve is blocked and the major portion of the air is directed rearwardly for propulsive thrust.

If front flap 60c is lowered below outlet 44 and rear flap 62c is raised to meet rear wall 42, as in broken line, a portion of the air flow is directed forwardly and downwardly for reverse thrust action. By suitable positioning of the various valve flaps, it will be obvious that any desired combination of lift and thrust can be obtained. Differential actionof the flaps on opposite sides of the center line provides roll control action to stabilize the vessel, as in a turn.

Figure 6:
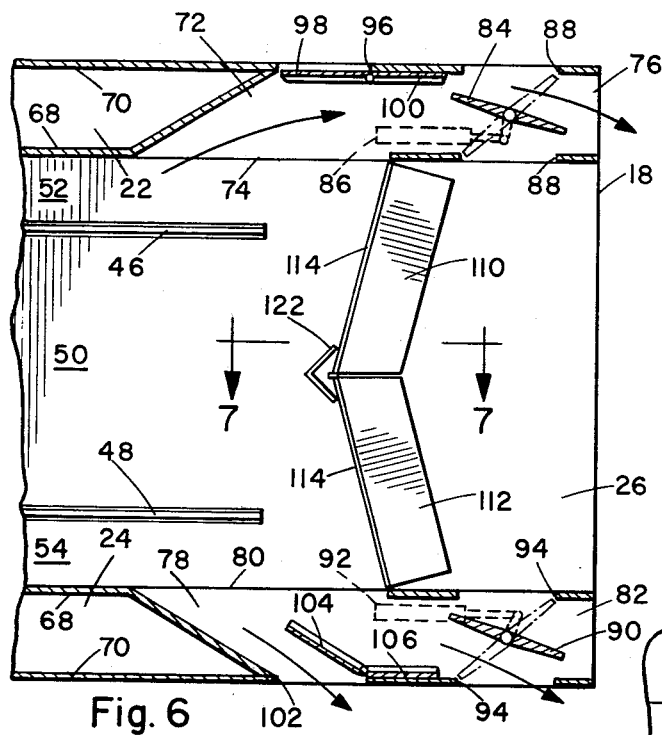
FIG. 6 is an enlarged sectional view taken on line 6—6 of FIG. 1.

At the rear of the air channel 26, trim rudders 110 and 112 can be lowered to any desired position to trap air in the channel for lift and to divert air through side tunnels 72 and 78. The trim rudders can also be operated differentially for roll control. Air flowing through the side tunnels passes over rudders 84 and 90, which provide directional control. Steering is also accomplished by opening diverter vane 104, to allow air to pass through outlet 102, in the same general direction as the air flow around rudder 90, as in FIG. 6. Diverter vane 98 is closed to prevent opposed steering action.

Figure 8:
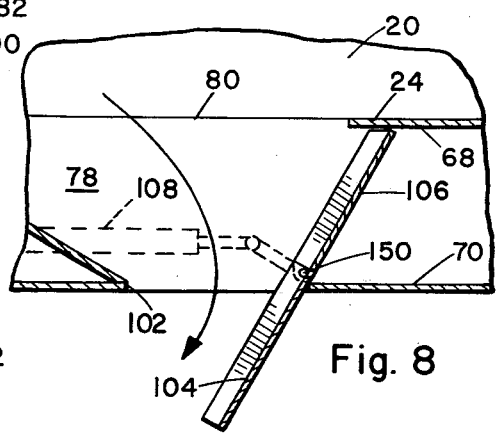
FIG. 8 is a further enlarged sectional view, similar to a portion of FIG. 6, showing the reverse thrust position of the vane.

The diverter vanes may also be used for reverse thrust action, as in FIG. 8. When diverter vane 104 is swung outwardly, baffle 106 swings inwardly to block tunnel 78, so that the air is directed out through outlet 102 and generally forward. Baffle 106 may be operated by a separate actuator or, in small vehicles, may be mechanically coupled to the diverter vane 104 by contact between confronting edges 150 adjacent the hinge. Air pressure would then reopen the baffle when the associated diverter vane is closed.

Additional steering action for fast turns or precise control is provided at the forward end through steering ports 124. With vanes 126 and 128 both turned inwardly, as in the full line position in FIG. 5, air is directed outwardly for lateral thrust reaction. By swinging vane 128 outwardly to the broken line position, a reverse thrust action is obtained.

Any suitable type of control system can be used to operate the various elements, either mechanical, electrical or fluid power. The control can also be manual or responsive to an autopilot type system, the techniques being well known. It will be evident that the complete system will provide very efficient control of an air cushion vehicle over a wide range of speeds.

Having described my invention, I now claim:

1. An air cushion vehicle, comprising:
    an elongated body having a forward bow portion, a stern, and a lower portion with a floor and side walls defining a longitudinal, rearwardly opening air channel in the underside thereof;
    a duct in said bow portion having a driven impeller therein;
    a plenum chamber extending from and having an outlet communicating with said air channel;
    valve means in said outlet for directing air flow from the plenum chamber selectively downwardly, rearwardly and forwardly;
    trim rudder means mounted in the rear portion of said air channel for selectively obstructing portions of the air channel;
    and steering means for diverting air flow from said air channel through portions of said side walls, said steering means including rearwardly opening tunnels in the rear portions of said side walls, said tunnels having inlets from said air channel forwardly of said trim rudder means, and directional control rudders pivotally mounted in said tunnels adjacent the rear openings thereof.

2. An air cushion vehicle according to claim 1, and including outlet openings in said tunnels opening to the exterior of said side walls, and diverter vanes pivotally mounted at the rear of said outlet openings to swing inwardly and outwardly therethrough.

3. An air cushion vehicle according to claim 2, and including a baffle in each of said tunnels coupled to the respective diverter vane to block the tunnel rearwardly of the outlet opening when the diverter vane swings outwardly therefrom.

4. An air cushion vehicle according to claim 1, and including longitudinally extending pliable curtains secured to and depending from said floor in said air channel, said curtains being spaced from said side walls and dividing the air channel into side channels and a central channel.

* * * * *